Figure 2:
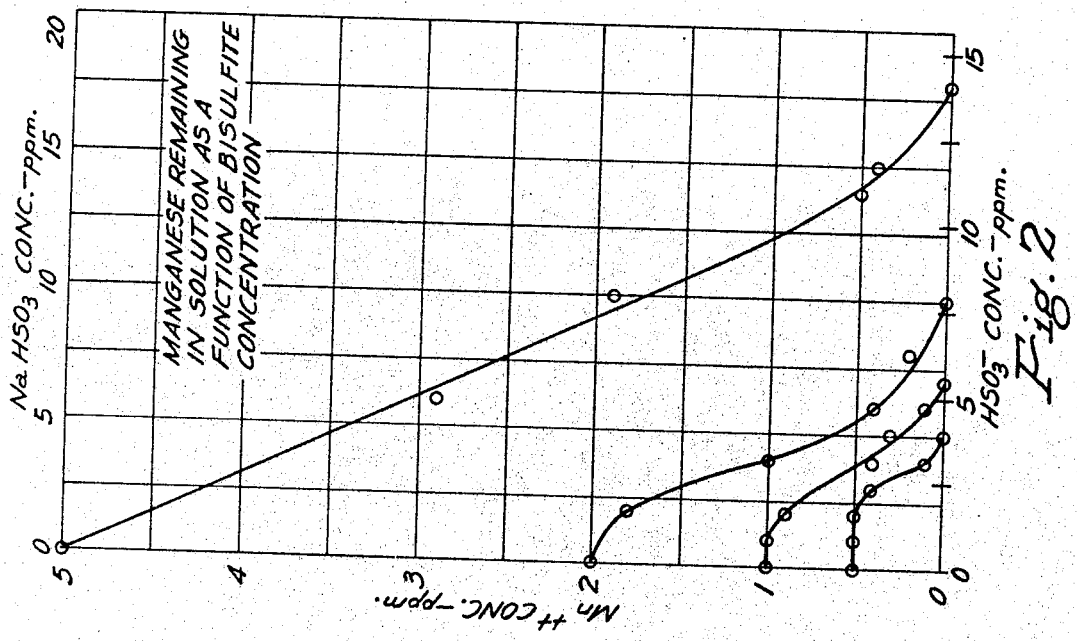

Oct. 24, 1967  G. B. HATCH ETAL  3,349,031

METHOD AND COMPOSITION FOR REMOVAL OF MANGANESE FROM WATER

Filed Aug. 20, 1965

INVENTORS.
GEORGE B. HATCH
ELIZABETH A. GUTHRIE
BY
William L. Krayer
ATTORNEY.

United States Patent Office 3,349,031
Patented Oct. 24, 1967

3,349,031
METHOD AND COMPOSITION FOR REMOVAL OF MANGANESE FROM WATER
George B. Hatch, Allison Park, and Elizabeth A. Guthrie, Philadelphia, Pa., assignors to Calgon Corporation, Pittsburgh, Pa.
Filed Aug. 20, 1965, Ser. No. 481,218
10 Claims. (Cl. 210—50)

This invention relates to methods of oxidizing the manganous ion to higher oxides, hydrous oxides, and hydroxides, to its subsequent removal from water and to compositions useful therefor.

Dissolved manganese is generally present in natural waters in the form of the manganous ion. Oxidation of the ion frequently occurs to some extent on exposure to air. Such oxidation leads to precipitation of dark brown or black hydrous oxides or hydroxides of the higher oxidation states of manganese which are very insoluble. When these precipitates remain suspended in the water, they cause objectionable discoloration known as "black water"; when they settle out, black deposits form which can block lines, or act as catalysts causing further manganese deposition. These deposits are very deleterious in textile and laundry operations as they interfere with dyeing processes and leave spots which are difficult to remove. They may increase the corrosion of copper, although this has not been completely proven. They are also troublesome in municipal water distribution systems where their presence makes it extremely difficult to maintain a chlorine residual.

The method usually employed to remove manganese is to oxidize the manganous ion to insoluble higher oxides, hydrous oxides, or hydroxides, which precipitate and may be removed by coagulation and settling, filtration, or both. The oxidation may be effected by raising the pH of the water to 8 or higher where naturally occurring dissolved oxygen or mechanical aeration brings about oxidation, or by the use of chlorine or permanganate.

However, all of these methods have difficulties which limit their usefulness and effectiveness. The use of a high pH to facilitate oxidation by dissolved oxygen is expensive and tends to cause scale deposition. Chlorine is only slightly more active than dissolved oxygen for oxidation of manganese; chlorine also requires pH elevation and to only a slightly lower level than that required for oxygen. Permanganate is expensive and one may not wish to have the permanganate ion in the water he is treating because of its intense color, and because excesses may themselves cause manganese deposits. These procedures all are somewhat critical, require a great deal of attention, and are more expensive than our methods.

In our methods, we add a salt of iron, copper, or cobalt and any compound yielding bisulfite ions in solution to the manganese-containing water. This results in the formation and subsequent precipitation of manganese dioxide or other higher oxidation state oxides, hydrous oxides, or hydroxides which may be removed by filtration. The iron, copper, or cobalt salt already added frequently also serves as a coagulant. Should additional coagulant be desired, it is preferable to add alum or more iron.

While we do not wish to be bound by any theories, we believe that our method is effective because the bisulfite ion together with the iron, copper, or cobalt ion catalyze the oxidation of the manganese by naturally occurring dissolved oxygen. At the same time the bisulfite is also oxidized by the dissolved oxygen. In fact, should the water have a low oxygen content or should too much bisulfite be added, it may be necessary to bubble air through the water in order to provide additional oxygen.

Because of the equilibrium between sulfite and bisulfite, both will simultaneously be present in the pH ranges of this invention. Relative concentrations of sulfite and bisulfite will depend upon the pH of the solution, but since bisulfite will generally predominate in the ranges of this invention, this invention will be described in terms of "compounds yielding bisulfite in solution." It is understood, however, that substantial quantities of sulfite will also be present. When an amount is stated in terms of the bisulfite yielded in solution, it is assumed that only bisulfite will be formed for the purposes of calculations of amounts in this invention, although in fact sulfite will also be formed.

Compounds yielding the bisulfite ion in solution include sulfurous acid, sulfur dioxide, and sulfite and bisulfite salts. We prefer to use sulfur dioxide or sodium bisulfite because of their low cost.

We have found that the minimum amount of bisulfite ion necessary to promote the oxidation of substantially all the manganous ion present in a solution is given approximately in parts per million by the equation:

$$4+2\,[\text{Mn}^{++}]=[\text{HSO}_3^-]$$

where $[\text{Mn}^{++}]$ is the manganous ion concentration in p.p.m., and $[\text{HSO}_3^-]$ is the bisulfite concentration in p.p.m.

Deviations from the linear relationship indicated by this equation become more pronounced at manganese levels of about 0.5 p.p.m. or less. Consequently, bisulfite concentrations somewhat lower than indicated by this equation frequently suffice at these low manganese levels. Otherwise, appreciably lower quantities of bisulfite than indicated by this equation will provide oxidation of part, but not all, of the manganese present. Consumption of the bisulfite by oxidizing contaminants may require additional bisulfite.

As previously discussed, excessive amounts of bisulfite should not be added as the excess bisulfite may use up the oxygen and thereby necessitate aeration.

The compositions of the precipitates which form on oxidation of dissolved manganese are somewhat indefinite and indicate the formation of some trivalent $[\text{Mn}^{+++}]$ as well as quatrivalent $[\text{Mn}^{++++}]$ manganese. Consequently, the minimum amount of oxygen required to oxidize a given amount of manganese is also somewhat indefinite. However, the stoichiometric amount of dissolved oxygen required for oxidation of the manganese to the quatrivalent state will suffice as an approximate guide of the minimum oxygen requirement. This is in addition to the stoichiometric amount of dissolved oxygen required for oxidation of the bisulfite to bisulfate. The presence of excess dissolved oxygen will promote a more rapid and complete oxidation and will not be detrimental.

The amount of iron, copper, or cobalt added (as ions) may range from about ½ to 10 p.p.m., but we prefer a range of about 1 to 2 p.p.m. The iron, copper or cobalt ions may be obtained from the addition of any of their soluble salts to the solution, although we prefer the ferric, cupric, and cobaltous soluble salts. Of course, if sufficient iron, copper, or cobalt is naturally present in the water, it is unnecessary to add more. Because they are least expensive and make the best manganese dioxide coagulants, we prefer soluble iron salts to copper or cobalt salts.

We have found that if the water has a pH below about 6, it is better to use ferric salts rather than ferrous salts because the ferrous salts are less effective in this pH range. While the bisulfite-yielding compound or the iron, copper, or cobalt may be added to the magnanese-containing water in any order, we prefer to add the iron, copper, or cobalt simultaneously or before adding the bisulfite-yielding compound so that the bisulfite and oxygen do not react before the iron, copper, or cobalt catalyst is present.

We have found that pH is a significant factor in determining the effectiveness of our methods. In general, our methods are operative between a pH of about 4.5 and a pH of about 8, but they are most effective between a pH of about 6 and a pH of about 7. The pH range of effective manganous ion oxidation depends to some extent upon the metal ion used. Cobalt has the widest range, being effective between a pH of about 4.5 and a pH of about 8. Iron and copper, on the other hand, are most effective in the range between a pH of about 4.5 and a pH of about 7. Should the pH of the water being treated not be within an effective pH range for the metal ion being used, it will be necessary to adjust the pH accordingly. In adjusting the pH one should take into consideration the effect upon pH of the salts he will be adding; for example, should the iron, cobalt, or copper salt or the compound-yielding bisulfite be acidic, one would adjust the pH of the water he is treating to a slightly higher level than that desired in the final solution in order to compensate. It is preferable to adjust the pH before adding the iron, cobalt, or copper salt or the compound-yielding bisulfite. All preceding statements as to pH are equally applicable to the use of the compositions described below.

We have formulated compositions which are designed for maximum effectiveness in manganese-containing waters. Our basic composition consists essentially of a mixture of (a) any soluble salt of iron, copper, or cobalt, and (b) any compound-yielding bisulfite ions in solution, where the ratio of (a) to (b) is about 0.01:1 to about 0.5:1; our preferred ratio of (a) to (b) is about 0.05:1 to about 0.2:1. These ratios are based on the weight of the iron, copper, or cobalt ion and the bisulfite ion; they are not based on the weight of the soluble salt of iron, copper, or cobalt, nor on the compound-yielding bisulfite ions.

A composition which we prefer consists essentially of a mixture of (a) any soluble salt of iron, preferably ferrous sulfate, and (b) any compound-yielding bisulfite ions in solution, where the ratio of (a) to (b) is about 0.01:1 to about 0.5:1; our preferred ratio of (a) to (b) is about 0.05:1 to about 0.2:1. These ratios are also based on the weight of the iron ion and the bisulfite ion.

These compositions may be formed as dry powders or as cohesive solids such as pellets or sticks and added to the manganese-containing water by a dry feed or by first forming a concentrated feed solution.

We have performed numerous experiments which illustrate the effectiveness of my methods and compositions in removing manganese from water.

In these experiments manganous sulfate equivalent to the desired amount of $Mn^{++}$ was added to 1 l. of water in a beaker. The water used for the test media contained 11 p.p.m. bicarbonate, 18 p.p.m. chloride, 78 p.p.m. sulfate, 20 p.p.m. calcium, and 6 p.p.m. magnesium, and had a total hardness as $CaCO_3$ of 76.

The beaker was set on a magnetic stirrer and the pH was adjusted to the desired level. Maintaining the pH at this level desired amounts of sodium bisulfite and iron, copper, or cobalt were added. The mixture was stirred with a 1″ x 3″ rotating paddle for three minutes at 100 r.p.m., seven minutes at 50 r.p.m., 40 minutes at 20 r.p.m., and let set for ten minutes without stirring. The precipitate was filtered off and the remaining solution was analyzed to determine $Mn^{++}$ concentration.

Table I gives the results where the initial solution contained 2 p.p.m. $Mn^{++}$.

TABLE I

[Manganese remaining in solution (2 p.p.m. $Mn^{++}$ at start)]

| Bisulfite | | $Fe^{++}$ (p.p.m.) | $Co^{++}$ (p.p.m.) | $Cu^{++}$ (p.p.m.) | pH | Manganese Remaining (p.p.m.) |
| --- | --- | --- | --- | --- | --- | --- |
| $NaHSO_3$ (p.p.m.) | $HSO_3^-$ (p.p.m.) | | | | | |
| 7 | 5.5 | ½ | ½ | ---------- | 5 | 1.0 |
| 7 | 5.5 | ½ | ½ | ---------- | 7 | 0.6 |
| 7 | 5.5 | ½ | ½ | ---------- | 7.5 | 0.7 |
| 7 | 5.5 | ½ | ½ | ---------- | 8 | 0.9 |
| 10 | 7.8 | ½ | ½ | ---------- | 6.5 | 0.1 |
| 10 | 7.8 | ½ | ½ | ---------- | 7.5 | 0.7 |
| 10 | 7.8 | ½ | ½ | ---------- | 8 | 0.9 |
| 7 | 5.5 | ½ | ---------- | ---------- | 6.5 | 0.0 |
| 7 | 5.5 | ¼ | ---------- | ---------- | 6.5 | 0.0 |
| 10 | 7.8 | ---------- | 1 | ---------- | 4.5 | 1.0 |
| 10 | 7.8 | ---------- | 1 | ---------- | 5.5 | 0.3 |
| 10 | 7.8 | ---------- | 1 | ---------- | 6.5 | 0.1 |
| 10 | 7.8 | ---------- | 1 | ---------- | 7 | 0.2 |
| 10 | 7.8 | ---------- | 1 | ---------- | 8 | 0.3 |
| 20 | 15.6 | ---------- | ---------- | 2 | 6.5 | 0.2 |
| 20 | 15.6 | ---------- | ---------- | 2 | 7 | 1.0 |
| 20 | 15.6 | ---------- | ---------- | 2 | 7.5 | 2.0 |
| 20 | 15.6 | ---------- | ---------- | 2 | 8 | 2.0 |

Figure 1:
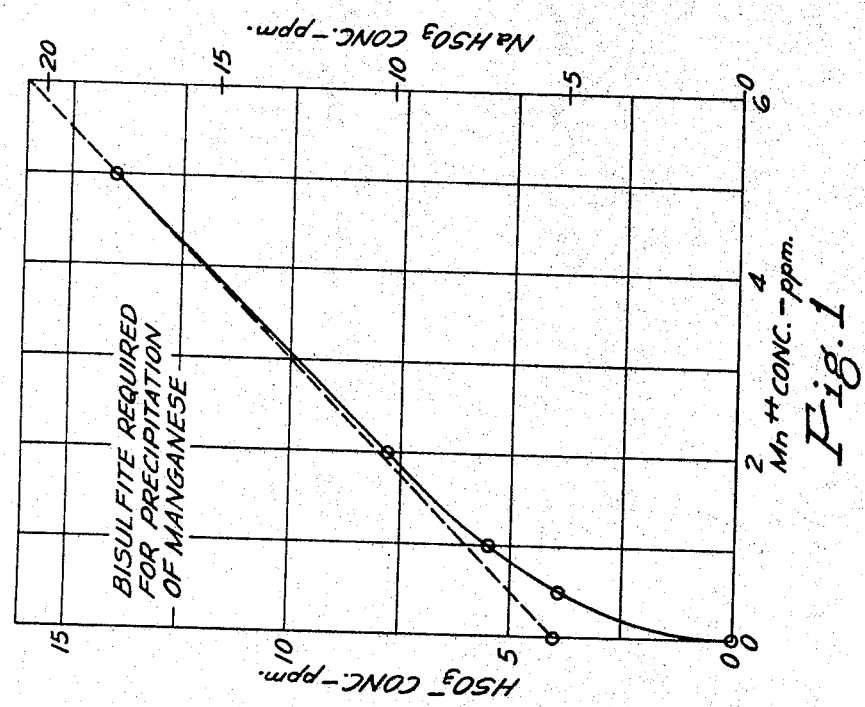

In another series of experiments a similar procedure was followed using 1 p.p.m. iron (as ferrous sulfate) and maintaining a pH of 6.5. The solid curve shown in FIG. 1 indicates the concentration of bisulfite required to precipitate substantially all of an amount of manganese. The dotted line corresponds to the equation $$4 + 2[Mn^{++}] = [HSO_3^-]$$

discussed previously which approximates the curve.

In a similar series of experiments the pH was maintained at 6.5 and 1 p.p.m. $Fe^{++}$ (as ferrous sulfate) was added. The four curves in FIG. 2 each indicate the amount of manganese remaining in solution after the addition of increasing amounts of $NaHSO_3$ to a given amount of manganese; the manganese concentration when the $NaHSO_3$ concentration is 0 is the initial manganese concentration.

Thus, it can be seen that our invention relates to methods and compositions for removing manganese from water.

We do not intend to be bound by methods, compounds, compositions, or examples given herein for illustrative purposes. Our invention may be otherwise practiced and embodied within the scope of the following claims.

We claim:

1. A method of precipitating manganese from water containing at least about 0.5 p.p.m. manganous ion, dissolved oxygen in at least an amount stoichiometrically equivalent to that required for the conversion of said manganous ion to $MnO_2$, at least about ½ p.p.m. iron, and having a pH of between about 4.5 and about 7, comprising adding to said water a compound which yields at least about 5 p.p.m. bisulfite ions in solution.

2. A method of oxidizing substantially all $Mn^{++}$ in water containing dissolved oxygen and having a pH of between about 4.5 and about 8, comprising adding a compound which yields bisulfite ion in solution in an amount in p.p.m. determined by the equation $$[HSO_3^-] = 2[Mn^{++}] + 4$$

and about ½ to 10 p.p.m. of a compound selected from the group consisting of soluble salts of iron, copper, and cobalt, where $[Mn^{++}]$ is the manganous ion concentration of said water in p.p.m. and $[HSO_3^-]$ is the bisulfite ion concentration in p.p.m. of said water after said compound yielding bisulfite ions has been added and exhausted of its bisulfite.

3. A method of oxidizing substantially all $Mn^{++}$ in water containing dissolved oxygen and having a pH of between about 4.5 and about 8, comprising adding a compound which yields bisulfite ion in solution in an amount in p.p.m. determined by the equation $$[HSO_3^-] = 2[Mn^{++}] + 4$$

and about 1 to 2 p.p.m. of a compound selected from the group consisting of soluble salts of iron, copper, and cobalt, where $[Mn^{++}]$ is the manganous ion concentration of said water in p.p.m. and $[HSO_3^-]$ is the bisulfite ion concentration in p.p.m. of said water after said compound yielding bisulfite ions has been added and exhausted of its bisulfite.

4. A method of oxidizing substantially all $Mn^{++}$ in water containing dissolved oxygen and having a pH of between about 6 and about 7, comprising adding a compound which yields bisulfite ion in solution in an amount in p.p.m. determined by the equation $$[HSO_3^-] = 2[Mn^{++}] + 4$$

and about 1 to 2 p.p.m. of a compound selected from the group consisting of soluble salts of iron, copper, and cobalt, where $[Mn^{++}]$ is the manganous ion concentration of said water in p.p.m. and $[HSO_3^-]$ is the bisulfite ion concentration in p.p.m. of said water after said compound yielding bisulfite ions has been added and exhausted of its bisulfite.

5. A method of oxidizing substantially all $Mn^{++}$ in water containing dissolved oxygen and having a pH of between about 6 and about 7, comprising adding a compound which yields bisulfite ion in solution in an amount in p.p.m. determined by the equation $$[HSO_3^-] = 2[Mn^{++}] + 4$$

and about ½ to 10 p.p.m. of a compound selected from the group consisting of soluble salts of iron, copper, and cobalt, where $[Mn^{++}]$ is the manganous ion concentration of said water in p.p.m. and $[HSO_3^-]$ is the bisulfite ion concentration in p.p.m. of said water after said compound yielding bisulfite ions has been added and exhausted of its bisulfite.

6. A solid composition useful for precipitating manganese from water containing $Mn^{++}$ consisting essentially of (a) a compound selected from the group consisting of soluble salts of iron, copper, and cobalt, and (b) a compound which yields bisulfite ions in solution where the ratio of the iron, copper, and cobalt to bisulfite ion is about 0.01:1 to about 0.5:1.

7. A solid composition useful for precipitating manganese from water containing $Mn^{++}$ consisting essentially of (a) a compound selected from the group consisting of soluble salts of iron, copper, and cobalt, and (b) a compound which yields bisulfite ions in solution where the ratio of the iron, copper, and cobalt to bisulfite ion is about 0.05:1 to about 0.2:1.

8. A solid composition useful for precipitating manganese from water containing $Mn^{++}$ and aiding in its coagulation consisting essentially of (a) a soluble salt of iron and (b) a compound which yields bisulfite ions in solution where the ratio of the iron ion to bisulfite ion is about 0.01:1 to about 0.5:1.

9. A solid composition useful for precipitating manganese from water containing $Mn^{++}$ and aiding in its coagulation consisting essentially of (a) a soluble salt of iron and (b) a compound which yields bisulfite ions in solution where the ratio of the iron ion to bisulfite ion is about 0.05:1 to about 0.2:1.

10. A solid composition useful for precipitating manganese from water containing $Mn^{++}$ and aiding in its coagulation consisting essentially of (a) ferrous sulfate and (b) a compound which yields bisulfite ions in solution where the ratio of the iron ion to bisulfite ion is about 0.01:1 to about 0.5:1.

References Cited

UNITED STATES PATENTS

| | | | |
|---|---|---|---|
| 2,069,621 | 2/1937 | Patrick | 210—80 |
| 2,648,440 | 8/1953 | Mullins | 210—80 |

MORRIS O. WOLK, *Primary Examiner.*

MICHAEL E. ROGERS, *Examiner.*